United States Patent [19]
Umeda et al.

[11] Patent Number: 5,726,557
[45] Date of Patent: Mar. 10, 1998

[54] VEHICULAR ELECTRIC POWER SYSTEM

[75] Inventors: Atsushi Umeda, Anjo; Makoto Taniguchi; Shin Kusase, both of Obu, all of Japan

[73] Assignee: Nippondenso Co., Ltd., Kariya, Japan

[21] Appl. No.: 658,740

[22] Filed: Jun. 5, 1996

[30] Foreign Application Priority Data

Jun. 6, 1995 [JP] Japan ................... 7-139703

[51] Int. Cl.$^6$ ........................................ H02P 9/34
[52] U.S. Cl. ...................... 322/21; 322/17; 322/28; 320/39
[58] Field of Search ............................ 322/21, 22, 25, 322/27, 28, 29

[56] References Cited

U.S. PATENT DOCUMENTS

| | | | |
|---|---|---|---|
| 4,636,706 | 1/1987 | Bowman et al. | 322/28 |
| 4,733,159 | 3/1988 | Edwards et al. | 323/282 |
| 4,825,139 | 4/1989 | Hamelin et al. | 322/90 |
| 5,059,886 | 10/1991 | Nishimura et al. | 322/28 |
| 5,355,071 | 10/1994 | Ishida et al. | 320/6 |
| 5,444,354 | 8/1995 | Takahashi et al. | 322/28 |
| 5,543,703 | 8/1996 | Kusase et al. | 322/16 |
| 5,608,616 | 3/1997 | Umeda et al. | 363/132 |

FOREIGN PATENT DOCUMENTS 4-138030   5/1992   Japan.

*Primary Examiner*—Steven L. Stephan
*Assistant Examiner*—Nicholas Ponomarenko
*Attorney, Agent, or Firm*—Cushman Darby & Cushman IP Group of Pillsbury; Madison & Sutro LLP

[57] ABSTRACT

A vehicular electric power system is composed of a rotating AC machine having polyphase armature coils, a full-wave rectifier for rectifying the generated voltages by a plurality of SiC-MOSFETs to give a rectified output to the battery unit, and a control device for selectively turning on the plurality of SiC-MOSFETs to raise the generated voltages by short-circuiting and open-circuiting the armature coils on the basis of the phases of voltages generated by the rotating AC machine at a predetermined duty factor.

8 Claims, 7 Drawing Sheets

VEHICULAR ELECTRIC POWER SYSTEM

CROSS REFERENCE TO RELATED APPLICATION

The present application is based on and claims priority from Japanese Patent Applications No. Hei 7-139703, filed on Jun. 6, 1995, the contents of which are incorporated herein by reference.

BACKGROUND OF THE INVENTION

The present invention relates to a vehicular electric power system and, more particularly, to a vehicular electric power system employing a rotating AC machine, such as an AC generator.

Reduction of the idling speed of internal-combustion engines has been desired in recent years to reduce the fuel consumption of vehicles and the enhancement of the output of a vehicular AC generator in a low-speed range has been required to cope with the reduction of the idling speed of the internal-combustion engine.

A rectifier proposed in, for example, JP-A No. 63-87137 has a high-side and a low-side half bridge circuit each comprising Si-MOSFETs as rectifying elements. This prior art rectifier raises the output voltage of an AC generator to improve the performance of the AC generator in a low-speed operating range by periodically and simultaneously turning on the Si-MOSFETs of the high-side or the low-side half bridge circuit to short-circuit the armature coils of the AC generator and to open-circuit the armature coils, using the so-called short-circuit flyback power generating operation of the AC generator.

In this prior art rectifier, however, the generated current flows through a diode having a high on-state resistance and which is connected in parallel to the Si-MOSFETs when the Si-MOSFETs are open-circuited. Thus, rectification loss is increased by the diode to reduce rectification efficiency. Accordingly, a rectifying system is desired in which the generated current does not flow through the diode connected in parallel to the Si-MOSFETs. Since the short-circuit flyback power generating operation of the AC generator generates a high surge voltage for charging a battery, it is possible that the Si-MOSFETs are destructed by a momentary high surge voltage.

The surge endurance of the rectifier may be enhanced by forming the same by Si-MOSFETs having a high breakdown voltage. However, such Si-MOSFETs has a high on-state resistance that increases rectification loss. Although the increase of rectification loss can be suppressed by using a surge absorbing circuit including a Zener diode or the like instead of using Si-MOSFETs having a high breakdown voltage to absorb the surge voltage, such a surge absorbing circuit increases the size the cost of the rectifier, hence those of the power supply unit. Accordingly, it is desirable to employ semiconductor switching devices having a high break-down voltage and a low on-state resistance that reduces rectification loss, and not requiring any surge absorbing circuit.

SUMMARY OF THE INVENTION

It is an object of the present invention to provide a vehicular electric power system capable of efficiently using the output of a rotating AC machine at a low rectification loss even in a low rotating speed range by effectively utilizing SiC-MOSFETs and properly controlling the SiC-MOSFETs without requiring any additional surge absorbing circuit.

The construction of an n-channel SiC-MOSFET will be described by way of example with reference to FIGS. 8 and 9 prior to the description of the preferred embodiments of the present invention.

The SiC-MOSFET is fabricated by the following processes.

An n-type surface layer 2 is formed on an n+ type source substrate 1 of SiC (which corresponds to a source electrode S shown in FIG. 9) by an epitaxial growth process. A p type well region 3 is formed in the surface of the n type surface layer 2 by an aluminum ion implantation process. An n+ type region 8 (which corresponds to a drain electrode D shown in FIG. 9) is formed in the surface of the p type well region 3 by a nitrogen ion implantation process.

The surface of the wafer is covered with a mask, such as a resist film or an insulating film, having an opening corresponding to a region of the wafer in which a trench 4 is to be formed, and the trench 4 is formed by a well-known RIE dry etching process. A gate insulating film 5, i.e., a silicon oxide film, is formed on the surface of the trench 4 by a thermal oxidation process, and a doped polycrystalline silicon is deposited on the trench 4 to form a gate electrode 6. Subsequently, a metal electrode 7 is formed in contact with the n+ type region 8 and the p type well region 3 to complete a SiC-MOSFET.

FIG. 9 shows an equivalent circuit of the SiC-MOSFET. In this SiC-MOSFET, a source-side parasitic diode Ds and a drain-side parasitic diode Dd are formed between the p type well region 3 and the source substrate 1 source electrode S) or the n+ type region 8 (drain electrode D). When the source electrode S is connected to the positive terminal of a battery, and the drain electrode D is connected to the armature coil of an AC generator, it is possible that a reverse current flows from the battery through the drain-side parasitic diode Dd to the armature coil. Therefore, the p type well region 3 and the drain electrode D are short-circuited to keep the p type well region 3 at a potential so that the parasitic diode Ds is able to prevent the reverse current.

The capabilities of the SiC-MOSFET for a semiconductor switching device will be examined in comparison with an Si-MOSFET, which is the same in structure as the SiC-MOSFET and has an Si source substrate.

When a high voltage (for example, +200 V) is applied across the source substrate 1 (source electrode S) and the n+ type region 8 (drain electrode D) while the SiC-MOSFET is in the off-state, a depletion layer 2a expands mainly toward the n type surface layer 2 to withstand the high voltage. Consequently, the n type surface layer 2 is connected as a source feedback resistor Rs (FIG. 8) in series to the source electrode S, whereby the channel resistance increases to increase resistance loss, such as rectification loss. Since the substrate 1 of the SiC-MOSFET is formed of single-crystal SiC, the thickness and the impurity density of the n type surface layer 2 may be far greater than those of the Si-MOSFET.

Suppose, by way of example, that the withstand voltage of the n type surface layer 2 is 300 V. Since the dielectric strength of Si is about 30 V/μm, the necessary thickness of the n type surface layer 2 to withstand a voltage corresponding to the withstand voltage of 300 V only by the n type surface layer 2 is about 20 μm, the impurity density of the same is $1\times10^{15}$ atom/cm$^3$ and the resistivity of the same is about 5 Ω.cm. On the other hand, since the dielectric strength of SiC is about 400 V/μm, the necessary thickness of the n-type surface layer 2 is about 4 μm, the impurity density of the same is $2\times10^{16}$ atom/cm$^3$ and the resistivity of the same is about 1.25 Ω.cm. Thus, the resistance of the n-type surface layer 2 of the SiC-MOSFET is about 1/20 of that of the n-type voltage resisting layer 2 of the Si-MOSFET. Consequently, the channel resistance of the SiC-MOSFET is far smaller than that of the Si-MOSFET.

The SiC-MOSFET and the Si-MOSFET were compared in on-state resistivity for different required withstand voltages. The results of comparison are shown in FIG. 10, in which a indicates a withstand voltage range for semiconductor switching devices, and b indicates a range in which the use of the SiC-MOSFET as a semiconductor switching device is more effective. It is known from FIG. 10 that the channel resistance changes negligibly even if withstand voltage is increased provided that the increase of the channel resistance due to the increase of the source parasitic resistance Rs is ignored, while the resistance of the n type surface layer 2 increases with the increase of withstand voltage in a positive correlation.

While the on-state resistivity of the Si-MOSFET increases in proportion to withstand voltage as the withstand voltage increases beyond 25 V, the increase of the resistance of the n type surface layer 2 of the SiC-MOSFET with the increase of withstand voltage is substantially negligible in a withstand voltage range below 250 V. Also the on-state resistivity increases gradually with the increase of, withstand voltage in a withstand voltage range beyond 250 V. The on-state resistivity is the sum of the channel resistance and the resistance of the n type surface layer 2. Although the channel resistance is dependent on various factors, as is obvious from FIG. 10, the resistance of the n type surface layer 2 is dominant in the high withstand voltage range.

It was found that the employment of the SiC-MOSFET thus constructed reduces resistance loss, including rectification loss. It also enables the use of the output of the AC generator at a high efficiency which cannot be expected when the Si-MOSFET is employed. The effect of a p-type SiC-MOSFET is similar to that of the foregoing SiC-MOSFET.

From such a point of view, the inventors of the present invention examined the characteristics of semiconductor switching devices that may replace Si-MOSFETs, and found that SiC-MOSFETs (silicon carbide MOSFETs) are suitable for use as the semiconductor switching devices of a vehicular electric power system as will be described below.

In view of the foregoing reason the present invention provides a vehicular electric power system in which a control means for selectively turning on the plurality of SiC-MOSFETs periodically performs an operation to raise the generated voltages by short-circuiting and open-circuiting the armature coils. A plurality of SiC-MOSFET rectifies the generated voltage to be charged to a battery unit.

According to the present invention, phase output signals and short-circuit duty factor signal are used in combination to produce the signals to turn on the SiC-MOSFETs. Currents can be supplied to the SiC-MOSFETs having a low on-resistance without passing parasitic diodes in both a power generating state and a short-circuited state of the armature coils even in a state where the engine is operating at a low idling speed. Accordingly, the vehicular electric power system operates at a high efficiency and provides a high output.

According to the present invention, the gate signals are applied to the SiC-MOSFETs from an external logic gate circuit 40. Accordingly, the control program to be carried out by the microcomputer 50 may be simple, and therefore, the microcomputer 50 is able to control the SiC-MOSFETs for high-speed on-operation even in a state where the AC generator 10 is operating at a high operating speed.

According to the present invention, the gate signals are supplied to the SiC-MOSFETs of one half bridge circuit by inverting the gate signals applied to the SiC-MOSFETs of another half bridge circuit. Accordingly, the control operation is simple and there is no possibility that the battery Ba is short-circuited and a high current flows.

According to the present invention, the phase output signals are produced from the pole position signal. Accordingly, the on-off operation of the SiC-MOSFETs can be stably controlled without being affected by noise attributable to short-circuit surge voltage.

According to the present invention, the rectifier is composed of the low-loss, high-withstand-voltage SiC-MOSFETs. Therefore, the vehicular electric power system need not be provided with external circuit protecting elements, such as Zener diodes, to operate with high reliability, and can be fabricated at a low cost.

According to the present invention, the SiC-MOSFETs are low-on-resistance devices, and therefore, rectification loss is very small and power can be provided at a high efficiency. In addition, the SiC-MOSFETs generate a small amount of heat as a matter of course. Thus, cooling of the SiC-MOSFETs is substantially unnecessary and may be provided with small cooling fins, so that the freedom of determining the disposition of the component parts including the pole position transducer Tr is enhanced.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DESCRIPTION OF THE PREFERRED EMBODIMENTS

A preferred embodiment of the present invention will be described hereinafter with reference to the accompanying drawings.

Figure 1:
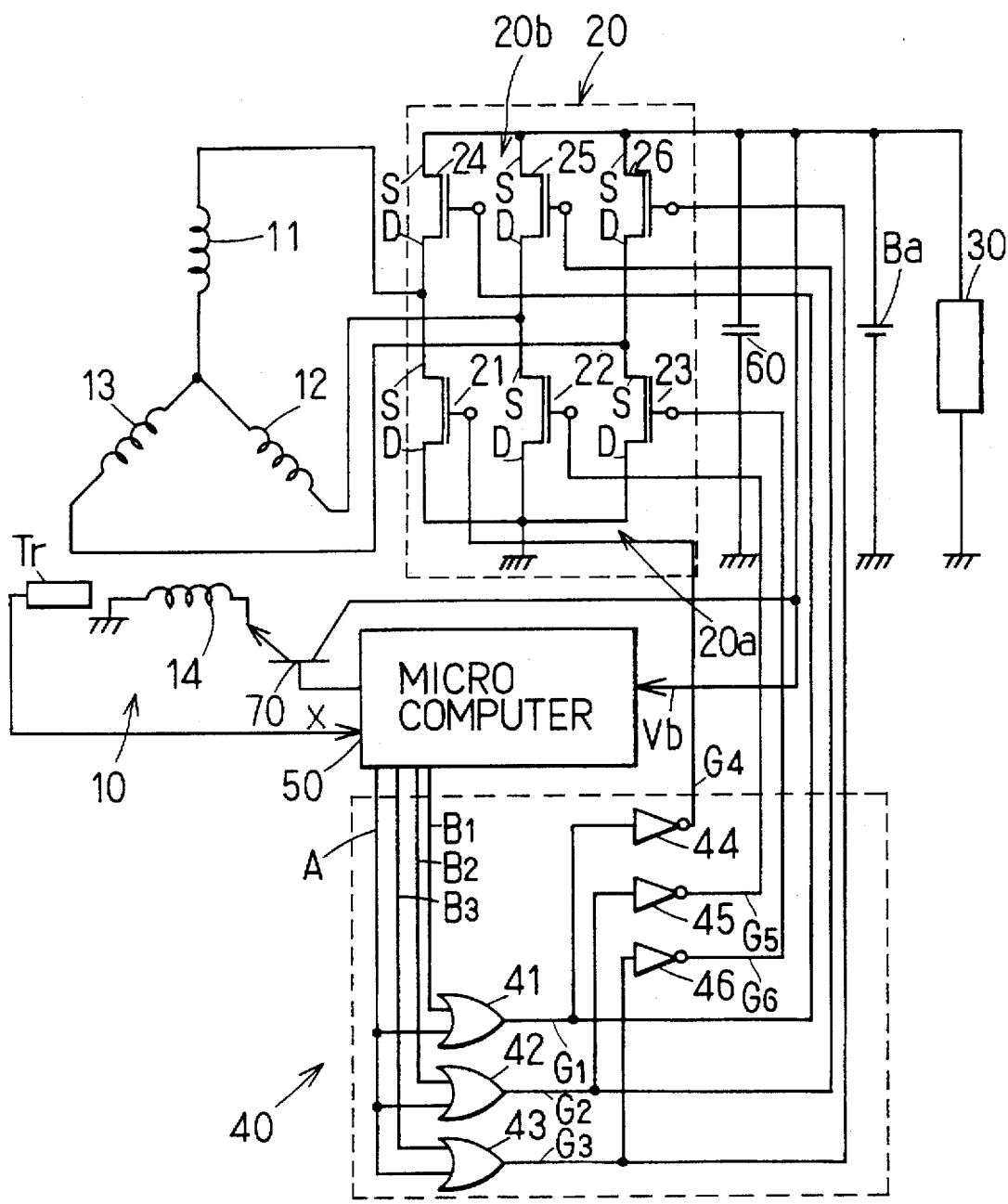
FIG. 1 is a circuit diagram of a vehicular electric power system of a preferred embodiment according to the present invention.

FIG. 1 shows a vehicular electric power system in a preferred embodiment according to the present invention. The vehicular electric power system includes an AC generator 10 installed in a vehicle. The AC generator 10 comprises a stator provided with Y-connected armature coils 11, 12 and 13, and a rotor provided with a field coil 14. The rotor of the AC generator 10 is driven by an engine of a vehicle to induce three-phase AC voltages in the armature coils 11 to 13 with a field current If flowing through the field coil 14. This vehicular electric power system has a rectifier 20 which comprises a low-side half bridge circuit 20a and a high-side half bridge circuit 20b.

Figure 8:
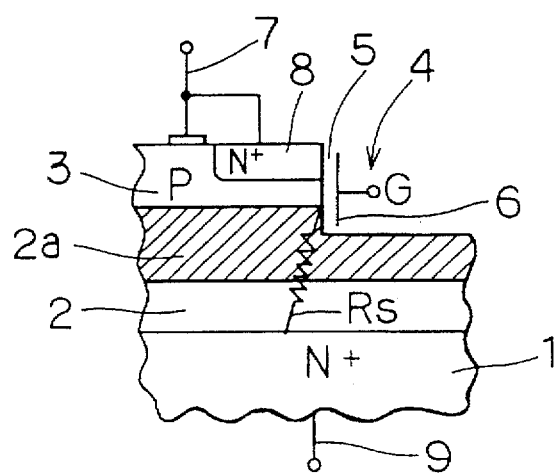
FIG. 8 is a fragmentary typical sectional view of a SiC-MOSFET.
Figure 9:
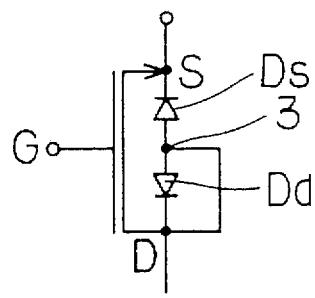
FIG. 9 is a circuit diagram of an equivalent circuit of the SiC-MOSFET of FIG. 8.
Figure 10:
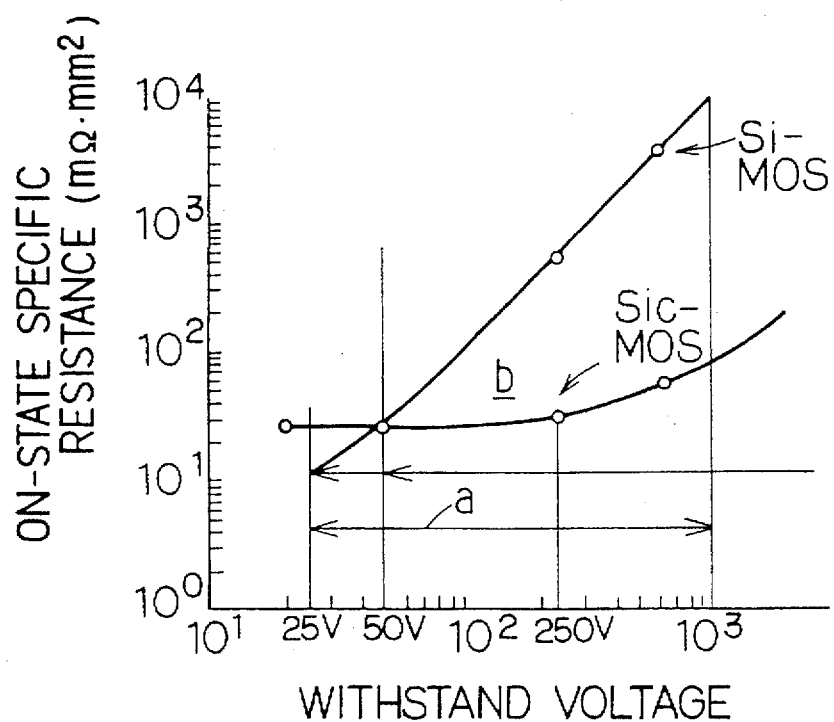
FIG. 10 is a graph comparing the relation between on-state specific resistance and withstand voltage for a SiC-MOSFET and a Si-MOSFET.

The low-side half bridge circuit 20a is composed of SiC-MOSFETs 21, 22 and 23 having drain electrodes D connected to a ground, and source electrodes S connected to the output terminals of the armature coils 11, 12 and 13, respectively. The high-side half bridge circuit 20b constructed together with the low-side half bridge circuit 20a forms a three-phase full-wave rectifying circuit. The high-side half bridge circuit 20b is composed of SiC-MOSFETs 24, 25 and 26. The SiC-MOSFETs 24 to 26 have drain electrodes D connected to the source electrodes S of the SiC-MOSFETs 21 to 23, respectively, and source electrodes S connected to the positive terminal of a battery Ba. A load 30 of the vehicle is connected in series to the battery Ba. A capacitor 60 for surge absorption is connected in parallel to the load 30. The SiC-MOSFETs 21 to 26 of the low-side half bridge circuit 20a and the high-side half bridge circuit 20b are the same in construction as the SiC-MOSFET shown in FIGS. 8 and 9. A microcomputer 50 is connected to the gates of the SiC-MOSFETs 21 to 26 respectively through a logic circuit 40 to control the SiC-MOSFETs for switching operations and rectifying operations.

Figure 2:
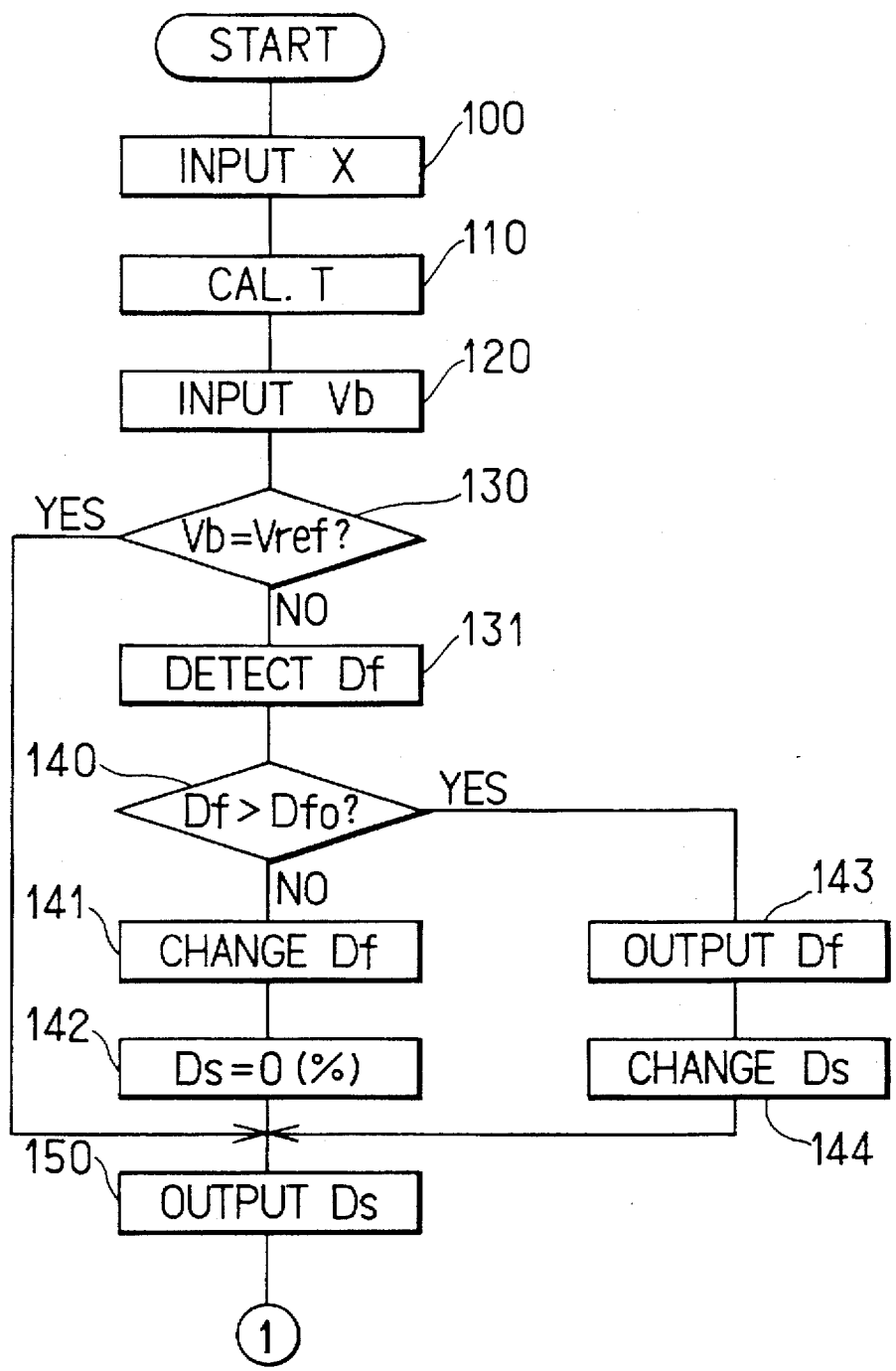
FIG. 2 is a flow chart of the first part of a control program to be carried out by a microcomputer included in the vehicular electric power system of FIG. 1.
Figure 3:
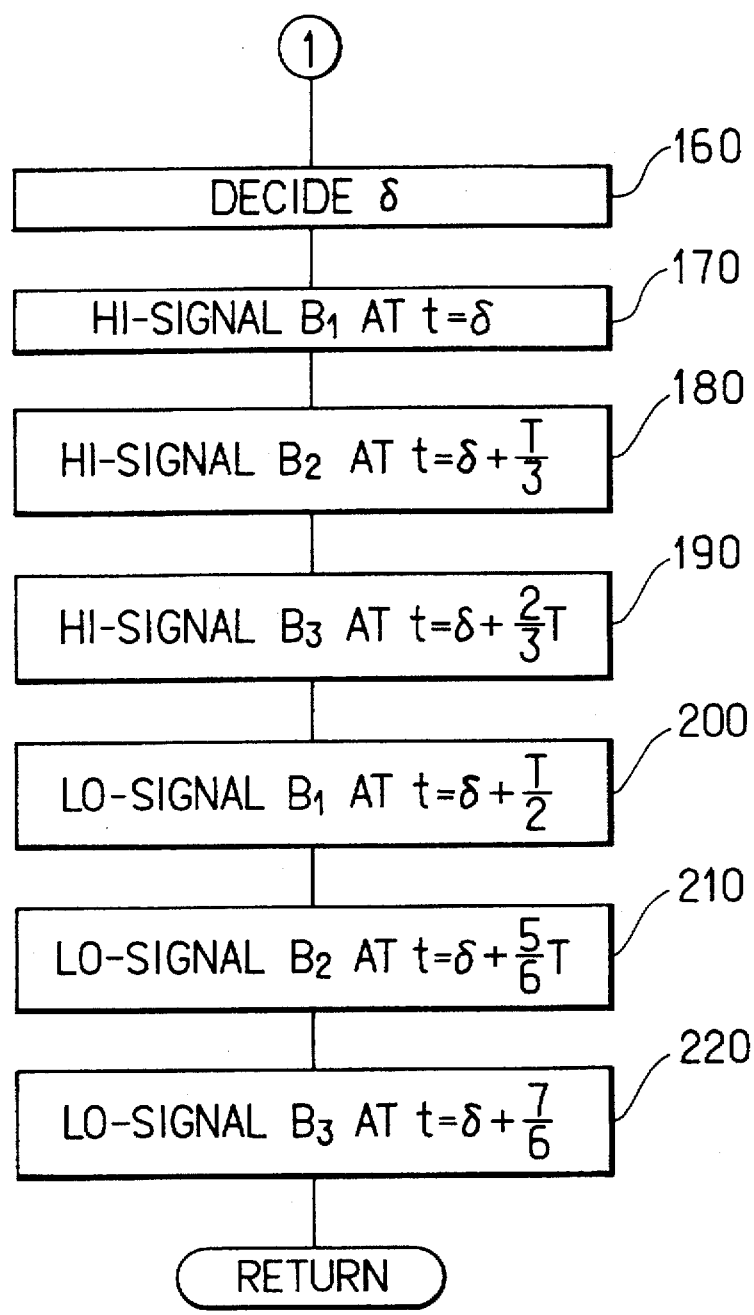
FIG. 3 is a flow chart of the latter part of the control program.

The microcomputer 50 carries out a control program expressed by the flow charts in FIGS. 2 and 3 according to the output DC voltage of the battery Ba (hereinafter referred to as "battery voltage Vb") and the output signal of a pole position transducer Tr, and carries out operations to control the duty cycle of a power transistor 70 connected to the logic circuit 40 connected to the SiC-MOSFETs 21 to 26, and the field coil 14 in parallel to the operation for carrying out the control program. The control program is stored before-hand in a ROM included in the microcomputer 50.

The pole position transducer Tr is composed of a rotary encoder and is supported coaxially with the rotor shaft of the AC generator 10. The pole position transducer Tr measures a position of the middle point of the width of an N-pole of the rotor with respect to the rotating direction and provides a pole position signal X. The logic gate circuit 40 is composed of three OR gates 41 to 43 and inverters 44 to 46 connected to the OR gates 41 to 43, respectively. The microcomputer 50 controls the OR gates 41 to 43 to control the SiC-MOSFETs 24 to 26 for on-off operations. The microcomputer 50 controls the inverters 44 to 46 through the OR gates 41 to 43 to control the SiC-MOSFETs 21 to 23 for on-off operations. The power transistor 70 has a collector connected to the positive terminal of the battery Ba, and an emitter connected through the field coil 14 to the ground. The power transistor 70 is controlled by the microcomputer 50 connected to the base thereof for switching operations.

When the engine is started by operating an ignition switch of the vehicle, the vehicular electric power system in this embodiment is actuated. Then, the microcomputer 50 starts operations according to the control program expressed by the flowcharts in FIGS. 2 and 3. When the engine is thus started, the AC generator 10 is driven for power generation. Then, the pole position transducer Tr generates pole position signals indicating the positions of the middle point of the width of the N-pole of the rotor of the AC generator 10. After the start of execution of the control program, the microcomputer 50 receives a pole position signal X from the pole position transducer Tr in step 100, and calculates an output period T of the AC generator 10 on the basis of the time difference between the successive pole position signals X in step 110. The microcomputer 50 receives a signal representing the battery voltage Vb in step 120 and compares the battery voltage Vb with a reference voltage Vbref in step 130. When Vb is equal to Vbref, the microcomputer 50 decides that the battery voltage Vb is appropriate, makes an affirmative decision in step 130 and executes step 150. Since the nominal battery voltage Vb is 12 V, the reference voltage Vbref is a voltage suitable for charging the battery Ba, such as 13.5 V. When a decision in step 130 is negative, a field current duty factor Df (refer to step 141) at which a field current If is supplied at present to the field coil 14 is detected in step 131. In step 140, the field current duty factor Df is compared with a predetermined duty factor Dfo. The predetermined duty factor Dfo is, for example, 95% to specify that the energized state of the field coil 14 is in the vicinity of a maximum energized state.

The decision in step 140 is negative if the duty factor Df is not greater than the predetermined duty factor Dfo, the field current duty factor Df is changed to make Vb=Vbref in step 141, and a field current duty factor signal representing a changed field current duty factor Df is applied to the base of the power transistor 70. The power transistor 70 is driven for switching operations at the changed duty factor Df, and the field current If supplied from the battery Ba to the field coil 14 is regulated by the switching operation of the power transistor 70.

After the operation in step 141 has been accomplished, a short-circuit duty factor Ds is set to 0% in step 142, which signifies that the output voltage of the AC generator 10 is controlled by only the field current supplied to the field coil 14.

If the field current duty factor Df is greater than the predetermined duty factor Dfo, the decision in step 140 is affirmative, and a field current duty factor signal representing the field current duty factor Df detected in step 131 is applied to the base of the power transistor 70. Consequently, the power transistor 70 is driven for switching operations at the changed field current duty factor Df and the field current If supplied from the battery Ba to the field coil 14 is regulated by the switching operation of the power transistor 70. After the operation in step 143 has been accomplished, the short-circuit duty factor Ds is changed to make Df=Dfo. After the operation in step 142 or 144 has been accomplished, a short-circuit duty factor signal A representing the short-circuit duty factor Ds is adjusted to 0% in step 142 or the changed short-circuit duty factor Ds set in step 144 becomes a HIGH level when the armature coils 11 to 13 are short-circuited and becomes a LOW level when the armature coils 11 to 13 are not short-circuited. Then, the phase angle δ of the output of the AC generator 10 is determined according to the output period T determined in step 110 by using functional equation, δ=f(T). The functional equation, δ=f(T) is derived from a fact that there is a fixed phase angle (the output phase angle δ) called a load angle formed between the phase of the pole position of the rotor and that of the three-phase AC voltage. Although the output phase angle δ is dependent on the rotating speed of the AC generator 10, the output phase angle δ can be determined from the relation with the output period T through experiments. Therefore, the output phase angle δ may be determined from a map showing the relation between δ and T expressed by the functional equation, δ=f(T).

After the operation in step 160 has been accomplished, a HIGH-level phase output signal B1 corresponding to the U-phase of the AC generator 10 is generated at time t=δ and is applied to the OR gate 41 in step 170. In step 180, a HIGH-level phase output signal B2 corresponding to the V-phase of the AC generator 10 is generated at time t=δ+T/3 (an electrical phase angle of 2 π/3 after the phase output signal B1 of the U-phase becomes a HIGH level) and is applied to the OR gate 42. In step 190, a HIGH-level phase output signal B3 corresponding to the W-phase of the AC generator 10 at time t=δ+2T/3 (an electrical phase angle of 4 π/3 after the phase output signal B2 becomes HIGH level) and is applied to the OR gate 43. Then, the phase output signal B1 goes LOW at time t=δ+T/2 in step 200, the phase output signal B2 goes LOW at time t=δ+5T/6 in step 210 and the phase output signal B3 goes LOW at time t=δ+7T/6 in step 220. Incidentally, the phase output signals B1, B2 and B3 go HIGH to turn on the SiC-MOSFETs 24 to 26 and go LOW to turn off the SiC-MOSFETs 24 to 26.

The short-circuit duty factor signal A and the phase output signals B1 to B3 are thus controlled. The OR gate 41 performs an OR operation between the short-circuit duty factor signal A and the phase output signal B1 and the output gate signal G1 of the OR gate 41 is given to the inverter 44 and the SiC-MOSFET 24. The OR gate 42 performs an OR operation between the short-circuit duty factor signal A and the phase output signal B2 and the output gate signal G2 of the OR gate 42 is given to the inverter 45 and the SiC-MOSFET 25. The OR gate 43 performs an OR operation between the short-circuit duty factor signal A and the phase output signal B3 and the output gate signal G3 of the OR gate 43 is given to the inverter 46 and the SiC-MOSFET 26.

The output gate signal G1 of the OR gate 41 is inverted by the inverter 44, and the output gate signal G4 of the inverter 44 is given to the SiC-MOSFET 21. The output gate signal G2 of the OR gate 42 is inverted by the inverter 45, and the output gate signal G5 of the inverter 45 is given to the SiC-MOSFET 22. The output gate signal G3 of the OR gate 43 is inverted by the inverter 46, and the output gate signal G6 of the inverter 46 is given to the SiC-MOSFET 23. Consequently, the SiC-MOSFETs 21 to 23 are turned on sequentially. The SiC-MOSFETs 24 to 26 are turned on sequentially by the gate signals G1 to G3 provided by the OR gates 41 to 43, respectively.

The foregoing operations will be described with reference to time charts shown in FIGS. 4 and 5.

Figure 4:
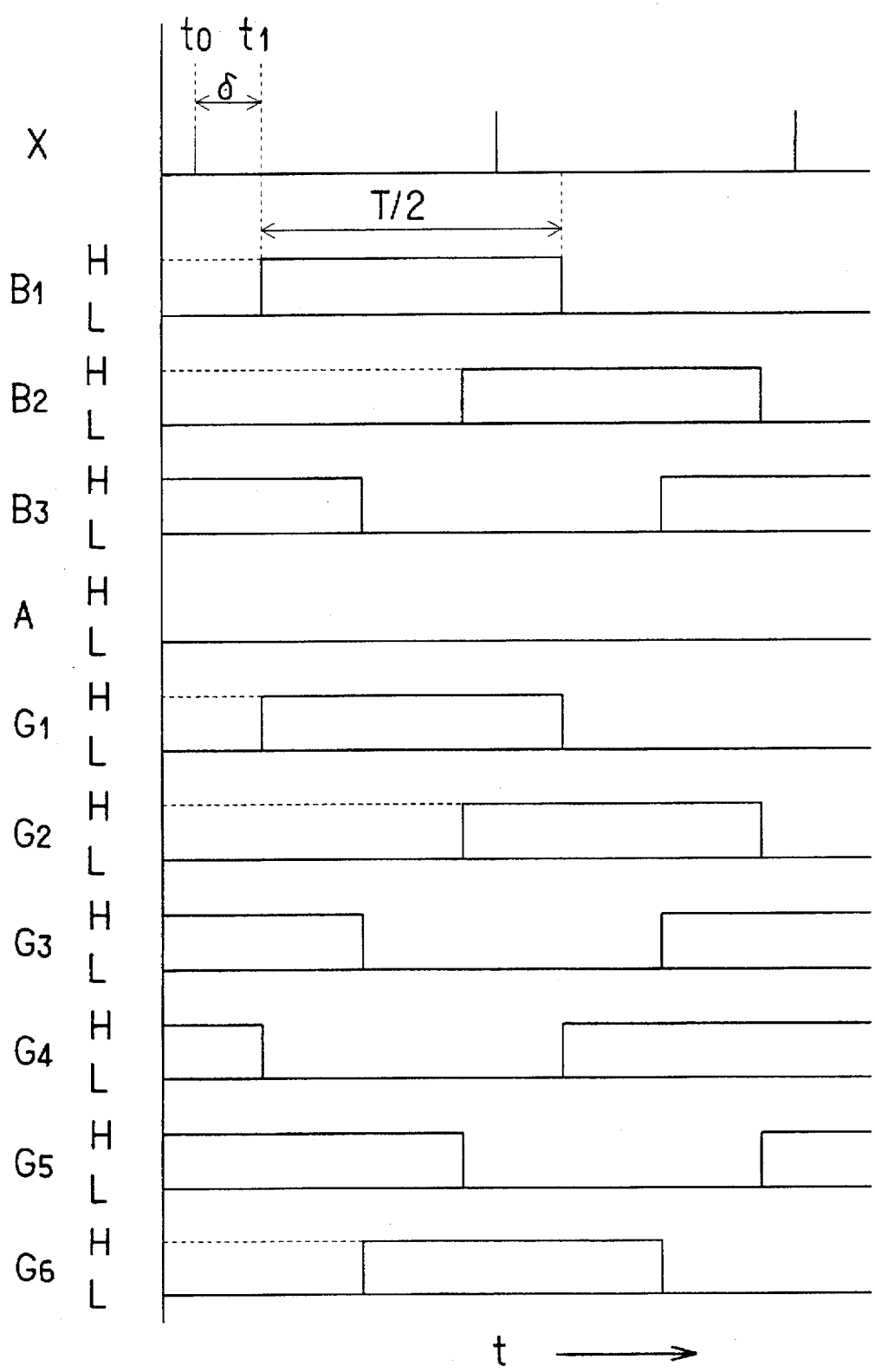
FIG. 4 is a time chart of signals provided by a pole position transducer, the microcomputer and a logic gate circuit in an operating mode where short-circuit duty factor $D_s=0\%$.

FIG. 4 is a time chart showing the signals used when the control operation for short-circuiting the armature coils 11 to 13 is not performed, i.e., when the short-circuit duty factor Ds is set to 0 in step 142. Since the short-circuit duty factor Ds equals 0, the short-circuit duty factor signal A provided in step 150 remains LOW as shown in FIG. 4. Therefore, the output gate signals G1 to G3 of the OR gates 41 to 43 correspond to the phase output signals B1 to B3 of the microcomputer 50, respectively (FIG. 4). The output gate signals G4, G5 and G6 of the inverters 44 to 46 are the complements of the phase output signals B1 to B3, respectively. Thus, the SiC-MOSFETs 21 to 26 are turned on at time intervals of 180° in the electric angle according to the flow of the output current of the AC generator 10 as shown in FIG. 4.

Figure 5:
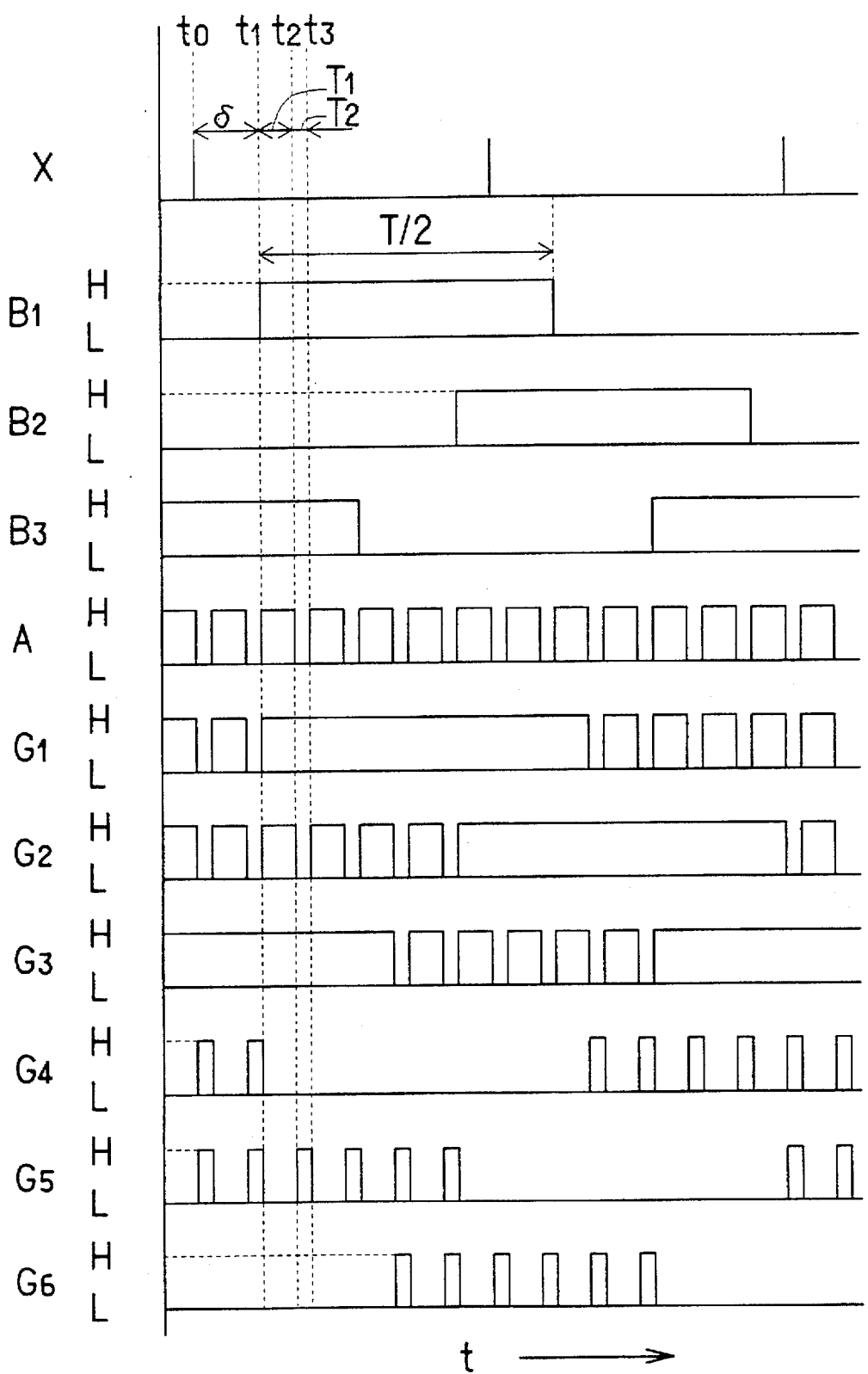
FIG. 5 is a time chart of signals provided by the pole position transducer, the microcomputer and the logic gate circuit in an operating mode where short-circuit duty factor $D_s \neq 0\%$.
Figure 6:
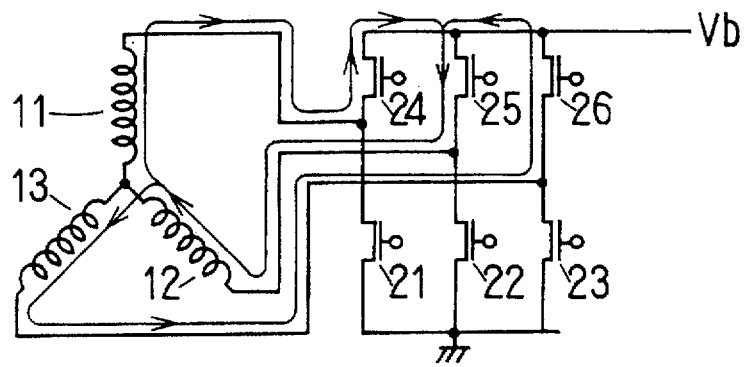
FIG. 6 is a circuit diagram for assistance in explaining passages in an AC generator and a rectifier through which currents flows when the short circuit duty factor Ds=0%.

FIG. 5 is a time chart showing the signals used when the control operation for short-circuiting the armature coils 11 to 13 is performed, i.e., when the short-circuit duty factor Ds is changed in step 144. The level of the short-circuit duty factor signal A provided in step 150 is dependent on the changed short-circuit duty factor Ds set in step 144. That is, the short-circuit duty factor signal A is used for momentarily changing a duty factor T1/(T1+T2) to adjust the output voltage of the AC generator 10 to the battery voltage Vb of the battery Ba. The OR gate 41 performs an OR operation between the short-circuit duty factor signal A and the phase output signal B1 and gives the gate signal G1 to the gate of the SiC-MOSFET 24. The OR gate 42 performs an OR operation between the short-circuit duty factor signal A and the phase output signal B2 and gives the gate signal G2 to the gate of the SiC-MOSFET 25. The OR gate 43 performs an OR operation between the short-circuit duty factor signal A and the phase output signal B3 and gives the gate signal G3 to the gate of the SiC-MOSFET 26. Thus, the SiC-MOSFETs 24 to 26 are turned on to short-circuit the armature coils 11 to 13 simultaneously while the phase output signals B1 and B2 are LOW, which signifies that operation for turning on the SiC-MOSFETs at the time when the output current of the AC generator 10 is to be supplied and for turning on the SiC-MOSFETs to short-circuit the armature coils can be simultaneously performed. The SiC-MOSFETs 21 to 23 are turned off by the outputs of the inverters 44 to 46, i.e., the complements of the OR gates 41 to 43, while the SiC-MOSFETs 24 to 26 are turned on, i.e., the period T1 between time t1 and t2. Consequently, the flow of the supply current to the armature coils is interrupted, the coils of the armature are short-circuited, and electric power is accumulated in the stator of the AC generator 10. In this state, the current flows along passages indicated by the arrows in FIG. 6.

Figure 7:
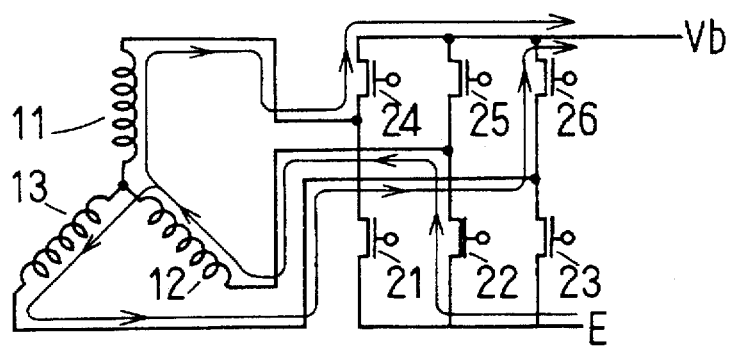
FIG. 7 is a circuit diagram for assistance in explaining passages in the AC generator and the rectifier through which currents flows when the short circuit duty factor Ds≠0%.

In a period for discharging the short-circuit electric energy into the battery Ba, for example, a period T2 between time t2 and time t3 shown in FIG. 5, only one of the SiC-MOSFETs corresponding to the power generating phase, for example, the SiC-MOSFET 22, is turned on, so that the accumulated short-circuit electric energy can be discharged satisfactorily into the battery Ba through passages indicated by the arrows in FIG. 7. Incidentally, when diodes are used instead of the SiC-MOSFETs 21 to 23, the time when the diodes turn on is the same as that when the SiC-MOSFETs 21 to 23 are turned on.

When SiC-MOSFETs are used in combination with a system for controlling the on-off operation of the SiC-MOSFETs like one of this type of embodiment that does not pass current through the parasitic diodes, it is possible to make the most of the low-on-resistance of the SiC-MOSFETs.

Although the external logic gate circuit 40 produces gate signals for controlling the SiC-MOSFETs 21 to 26 in this embodiment, the functions of the logic gate circuit 40 may be included in the control program to be carried out by the microcomputer.

Although the gate signals to be applied to the SiC-MOSFETs 21 to 23 are produced by inverting the gate signals to be applied to the SiC-MOSFETs 24 to 26 in this embodiment, the gate signals to be applied to the SiC-MOSFETs 24 to 26 may be directly applied to the SiC-MOSFETs 21 to 23 without being inverted.

Although the phase output signals B1 to B3 are turned HIGH at time intervals of 180° in this embodiment, the time intervals may be less than 180°.

When carrying out the present invention, the gate signals to be applied to the SiC-MOSFETs 21 to 23 need not necessarily be produced by inverting the gate signals to be applied to the SiC-MOSFETs 24 to 26. The gate signals to be applied to the SiC-MOSFETs 24 to 26 may be produced by inverting the gate signals to be applied to the SiC-MOSFETs 21 to 23.

The AC generator 10 of the present invention need not necessarily be a three-phase AC generator but may be a polyphase AC generator.

The present invention may employ a three-phase half-wave rectifier instead of the three-phase full-wave rectifier 20.

The present invention is effective in a state where the AC generator 10 is operating for regenerative braking and may be applied to a rotating AC machine that functions as both an electric motor and a generator.

The steps of the control programs in this embodiment may be realized by hardware logic structure as functional execution means.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A vehicular electric power system comprising:
    a rotating AC machine having a rotor, and polyphase armature coils that generate polyphase voltages as said rotor rotates;
    a rectifier connected across said armature coils and a battery unit for rectifying generated voltages, said rectifier composed of a plurality of bridge-connected-SiC-MOSFETs to give a rectified output to said battery unit; and
    a control means connected to said SiC-MOSFETs for selectively turning on said SiC-MOSFETs to control said rectifier to rectify said generated voltages, wherein said control means comprises a control unit for controlling said SiC-MOSFETs to perform short-circuiting and open-circuiting of said armature coils, thereby generating additional rectified output provided to said battery unit.

2. A vehicular electric power system according to claim 1, wherein said control unit comprises:
    a first decision means for deciding periods in which said generated voltages of said armature coils as rectified outputs are provided to said battery unit according to respective phases of said generated voltages;
    a second decision means for deciding timing of short-circuiting said armature coils at a predetermined duty factor;
    a control signal generating means that generates, on the basis of decisions made by said first and said second decision means, control signals to control said SiC-MOSFETs to perform said short-circuiting and open-circuiting of said armature coils.

3. A vehicular electric power system according to claim 1, wherein said rectifier comprises a high-side half bridge circuit including a plurality of SiC-MOSFETs, and a low-side half bridge circuit including a plurality of SiC-MOSFETs; and said control unit turns on all SiC-MOSFETs of said high-side half bridge circuit to perform said short-circuiting of said armature coils.

4. A vehicular electric power system according to claim 1, wherein said rectifier is a polyphase full-wave rectifier comprising a high-side half bridge circuit including a plurality of SiC-MOSFETs, and a low-side half bridge circuit including a plurality of SiC-MOSFETs; and
    said control unit comprises:
        a first decision means for deciding, according to respective phases of said generated voltages, periods in which said generated voltages of said armature coils as rectified outputs are provided to said battery unit,
        a second decision means for deciding timing of short-circuiting said armature coils at a predetermined duty factor, and
        a control signal generating means that generates, on the basis of decisions made by said first and said second decision means, a first control signal to control said SiC-MOSFETs of one of said high-side and said low-side half bridge circuit, and a second control signal to control said SiC-MOSFETs of the other half bridge circuit by inverting said first control signal.

5. A vehicular electric power system according to claim 2, further comprising a pole position detecting means for detecting said position of poles of said rotor of said rotating AC machine,
    wherein said first decision means decides said phases of said generated voltages on the basis of output of said pole position detecting means when said periods in which said rectified output is provided to said battery unit are decided.

6. A vehicular electric power system including a battery unit comprising:
    an AC generator having a field coil and polyphase armature coils for generating polyphase output voltages;
    a rectifier having a high-side half bridge circuit and a low-side half bridge circuit and connected between said armature coils and a battery unit for supplying a rectified output voltage of said AC generator to said battery unit, said high-side and low-side bridge circuits comprising a plurality of SiC-MOSFETs;
    a field current supplying means connected to said field coil; and
    a control means, having a microcomputer connected to said field coil supplying means and a logic gate circuit connected between said microcomputer and said SiC-MOSFETs, for controlling said SiC-MOSFETs to supply said rectified output voltage; wherein said microcomputer controls said SiC-MOSFETs to perform short-circuiting and open-circuiting of said armature coils, thereby supplying additional rectified output voltage to said battery unit.

7. A vehicular electric power system according to claim 6, wherein said microcomputer comprises:
    means for deciding periods in which said generated output voltages are rectified and supplied to said battery unit according to respective phases of said output voltages;
    means for deciding timing of short-circuiting said armature coils at a predetermined duty factor; and
    means for generating control signals to control said SiC-MOSFETs through said logic gate circuit on the basis of decisions made by said means for deciding periods and said means for deciding timing.

8. A vehicular electric power system according to claim 7, further comprising means for detecting a relative position between said field coil and said armature coils, wherein said means for deciding timing decides said phases of said generated voltages on the basis of output of said relative position detecting means when said periods in which said rectified voltage output is supplied to said battery unit are decided.

* * * * *